Oct. 17, 1967 B. S. ATAL ETAL 3,348,150

DIVERSITY TRANSMISSION SYSTEM

Filed July 27, 1964 2 Sheets-Sheet 1

INVENTORS B. S. ATAL
M. R. SCHROEDER
BY
ATTORNEY

Oct. 17, 1967 B. S. ATAL ET AL 3,348,150

DIVERSITY TRANSMISSION SYSTEM

Filed July 27, 1964 2 Sheets-Sheet 2

United States Patent Office 3,348,150

Patented Oct. 17, 1967

3,348,150

DIVERSITY TRANSMISSION SYSTEM

Bishnu S. Atal, Murray Hill, and Manfred R. Schroeder, Gillette, N.J., assignors to Bell Telephone Laboratories, Incorporated, New York, N.Y., a corporation of New York Filed July 27, 1964, Ser. No. 385,134

10 Claims. (Cl. 325—56)

This invention relates to radio transmission systems and, more particularly, to space-diversity transmission systems.

In communication systems utilizing the propagation of radio waves to convey information between the transmitting and receiving terminals of the system, an effect known as fading, characterized by variations in the strength of the received radio signal, is often encountered. Although fading may be the result of different transmission factors, including atmospheric effects and discontinuities in the transmission medium, the most common type is caused by propagation of the signal over more than one path, followed by a recombination of the components from various paths by vector addition at the receiving antenna. The amplitude of the signal at the receiver antenna is thus dependent on the path length differences and amplitudes of the component signals, both of which can vary with time. The resulting phenomena is known as fading due to multipath interference.

A number of techniques for reducing the effects of multipath fading have been proposed. These include frequency diversity systems in which the same signal is transmitted from one terminal station on a number of different carrier frequencies, space diversity systems in which a number of spaced receiver antennas are used to pick up a single frequency signal, and systems which simultaneously use both a number of different frequencies and a number of spaced receiver antennas. These techniques are effective because it is quite unlikely that all signals received, either on different frequencies or at different locations, will undergo the same path influences. Yet, they place a great burden on receiving equipment requirements; either several receivers must be used together, or a special receiver adapted for multiple signal reception must be provided.

It is the principal object of this invention to reduce the effects of fading in speech communication systems using amplitude modulation without widening the required transmission bandwidth.

It is a further object of the invention to assure that relatively constant signal power is available at each receiver terminal of a space-diversity, mobile, communication system.

It is yet another object of the invention to achieve a substantial reduction in the effects of multipath fading without any modification whatever of the receiving equipment of a radio system.

The present invention is thus directed to a space-diversity transmission system wherein the signal supplied to each of a number of separated transmitting antennas, operating on the same assigned carrier frequency, are individually processed prior to transmission. In large measure, the invention springs from the observation that a wide band of frequencies will fade coherently if the several path length differences are small, and that the band of frequencies which will fade coherently becomes narrower as the path length differences increase. If the fade length differences are very large, even a narrow band of frequencies will not fade coherently. In such fading, the power averaged over a band of frequencies several times larger than the reciprocal of the delay corresponding to the largest path length difference, will have considerably fewer variations with time compared to nonselective fading, where all frequencies fade coherently. The invention thus takes advantage of this effect to assure that fading is highly selective such that two frequencies spaced 20 to 30 c.p.s. apart will not fade coherently. This is achieved by processing a speech signal prior to transmission to produce many uncorrelated speech signals with the property that any linear combination of these signals does not differ much from the original speech signal either in over-all quality or in intelligibility.

According to the invention, processing of the signal in each of a number of parallel channels is carried out with a linear filter characterized by an impulse response that preferably is symmetric in time. For example, a filter whose response consists of impulses having a duration of approximately 50 $\mu$sec. with individual impulses spaced about 1 $\mu$sec. apart and with amplitudes $+1$ or $-1$ chosen at random have been found to be quite satisfactory. Because of the time symmetry of the response, the filters may be said to exhibit a truncated symmetrical impulse response. The impulse response for each channel is selected in accordance with a schedule such that each differs from and complements all others. As a result, signals reaching a receiver station from all or a lesser number of spaced transmitters do so without appreciable distortion. Since the pattern of modification is different for each signal, the likelihood of all signals fading out is very small. This assures a relatively constant power level even during periods of deep fading.

To combat fading, therefore, it is in accordance with the invention to transmit several such filtered speech signals, through appropriate modulation, e.g., amplitude modulation, simultaneously in the same frequency band from widely-spaced antennas with independent transfer functions. The receiver, after demodulation, produces a combination of the filtered speech signals, with a power factor that fluctuates much less than that of any single channel.

The capabilities of this transmission system have been found effective to combat widely different kinds of fading, such as Raleigh and sinusoidal fading. Advantageously, moreover, transmission of speech in this fashion does not require any modification of the receiving equipment over that required for single channel transmission. Since a single transmitter station generally serves numerous individual receiver stations, modification of the transmitter station is economically expedient. Furthermore, no additional bandwith is required for transmission as compared with transmission via a single channel.

The invention will be more fully apprehended from the following detailed description of an illustrative embodiment thereof taken in connection with the appended drawing in which.

Figure 1:
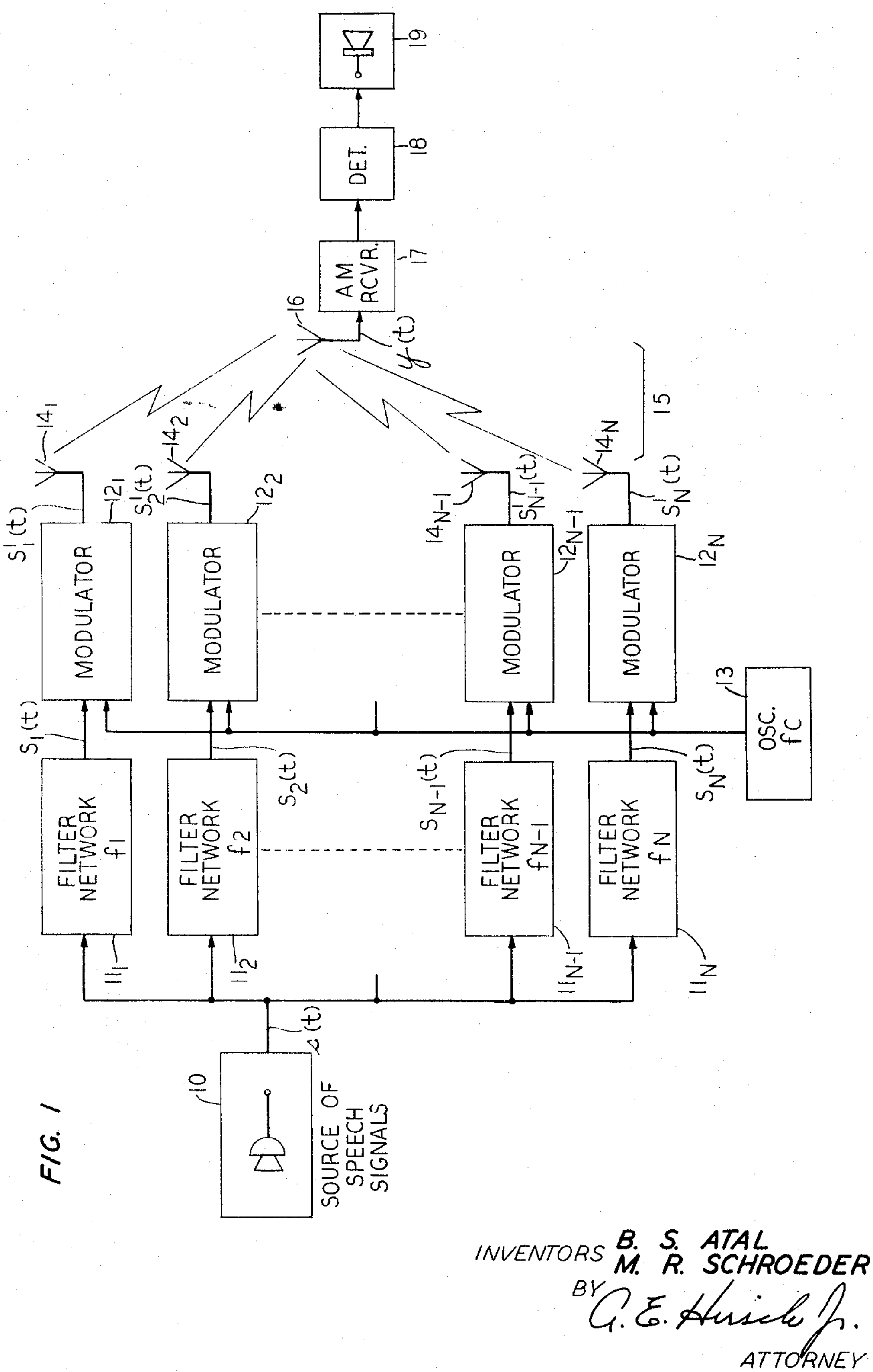
FIG. 1 is a block schematic diagram which illustrates a single transmitter station employing a number of separated individual channels, programmed in accordance with the invention, and a single receiving station.

A two-station speech communication system which employs the features of the present invention is illustrated in FIG. 1. Typically, one or both of the stations is carried by a moving vehicle such that the momentary transmission path between the two varies from moment to moment. Fading, due to multipath transmission and the like is, therefore, likely to be experienced. To avoid this, the transmitter at one or both of the stations (only one is shown in the figure) is equipped with a plurality of individual channels, each of which includes signal processing apparatus and a transmitter. The channel transmitters, each operating on the same carrier frequency, supply a like number of individual antennas spaced apart from one another.

At the transmitter station, speech signals from any conventional source, e.g., ordinary telephone transmitter 10, are thus supplied to a number of parallel channels, each of which includes a processing network, e.g., filter 11 and a modulator 12. Filters $11_1$, $11_2$ . . . $11_n$ are phase linear networks which have a highly irregular, frequency response. Each has a power gain equal to one. Preferably, the average spacing between successive maxima is approximately 30 c.p.s. Further, the frequency and impulse responses of any two of the filters, e.g., $11_1$ and $11_2$, are almost uncorrelated. Speech signals at the output of filters 11 are used to modulate the same carrier frequency. Carrier frequency signals are supplied to each of modulators 12 by oscillator 13. As a result, a set of amplitude-modulated signals, each somewhat different from all others but each, at the same time, carrying all of the signal information, are supplied individually to antennas 14. The signals are then radiated by the several antennas, which are sufficiently spaced apart to insure independent transmission paths to the receiver station. Since the different speech signals are transmitted in the same radio frequency band, no extra bandwith is required for transmission.

After being propagated over the many different paths, shown generally as paths 15 in FIG. 1, the signals combine vectorally at antenna 16 of the receiver station. A conventional AM receiver 17, equipped with a synchronous or envelope detector 18, may be used to receive the radio frequency signals and deliver a speech signal, equivalent to the one supplied by source 10, to utilization apparatus 19.

The reduction in fading achieved by this transmission system is dependent on the number of independent transmission paths or channels used for conveying a signal to the receiver station. For Raleigh fading and envelope detection, the fading envelope is approximately a Chi-square distribution with 2N degrees of freedom, where N denotes the number of independent channels. An estimate of the improvement secured from the use of additional channels may be obtained from an examination of the properties of the Chi-square distribution. Table I does this by showing the percentage of time the square of the fading envelope will lie outside of a specified amplitude range about its mean value as a function of the number of channels used.

TABLE I

| No. of Channels Used | Percentage of the time fading envelope squared lie outside a specified range about its mean value | | | |
|---|---|---|---|---|
| | ±1 db | ±2 db | ±5 db | ±10 db |
| 1 | 83.21 | 67.29 | 31.33 | 9.52 |
| 2 | 75.51 | 53.48 | 14.58 | 1.75 |
| 4 | 65.25 | 37.19 | 4.11 | .08 |
| 8 | 52.00 | 20.21 | 0.46 | .01 |
| 16 | 24.31 | 7.11 | 0.01 | ≈0 |

It will be observed that with one channel, the square of the fading envelope is outside ±5 db range 31% of the time, whereas with four channels it is outside the same range only 4% of the time. If it is assumed that an amplitude variation of ±5 db can be tolerated for speech, four channels will provide a satisfactory reduction in fading. Experience indicates that a four channel system is adequate.

The manner by which the transmission system of the invention overcomes the effects of multipath fading can perhaps be better appreciated by considering a cosine wave of frequency $f$ as input to the system. The signal $y_n(t)$ at the single receiving antenna due to one of the N transmitting antenna, each of which is spaced apart from the others, and each of which radiates signals on the same frequency, is given by $$y_n(t)=\frac{1}{\sqrt{N}}[R_n(t)H_n(f)\cos 2\pi ft \cos(2\pi f_c t+\theta_n(t))] \quad (1)$$

wherein $R_n(t)$ and $\theta_n(t)$ are envelope and phase variations, respectively, produced by fading of the $n$th transmission path, $f_c$ is the carrier frequency, $f$ is the modulating frequency, and $H_n(f)$ is the transfer function of the $n$th filter. The complete signal $y(t)$ at the receiving antenna is then the sum of $y_n(t)$ over $n$ and consists of the carrier frequency and two side band components. The amplitude $A_s$ of the side band components which determines the amplitude of cos $2\pi ft$ after demodulation, is given by $$A_s(f,t)=\frac{1}{\sqrt{N}}\left[\left\{\sum_{n=1}^{N}H_n(f)X_n(t)\right\}^2+\left\{\sum_{n=1}^{N}H_n(f)Y_n(t)\right\}^2\right]^{1/2} \quad (2)$$

where:

$$X_n(f)=R_n(t)\cos\theta_n(t)$$

and $$Y_n(t)=R_n(t)\sin\theta_n(t)$$

It can be seen from Equation 2 that a cosine wave of frequency $(f+\Delta f)$ will tend to fade relatively independently at one frequency, $f$, if $$\frac{1}{N}\sum_{n=1}^{N}H_n(f)H_n(f+\Delta f)$$

is small. The minimum spacing $\Delta f$ between two frequencies which fade independently of each other is largely dependent on the impulse responses of the filter network. The smaller the spacing between frequencies, i.e., the smaller $\Delta f$, the longer the impulse responses of the filter networks. However, a long impulse response may produce objectionable reverberation in speech. On the other hand, if the spacing is large, gaps may be produced in the spectrum which may be subjectively perceptible. Thus, the minimum value of $\Delta f$, i.e., $(\Delta f)_{min.}$, should be a compromise between these two considerations. It follows, therefore, that the several filters used at one station should satisfy the following requirements:

(1) They should not produce excessive reverberation.

(2) They should not produce any perceptible spectral distortion, i.e., coloration of speech.

(3) The autocorrelation function of the transfer function, considering N filters to form an ensemble and the frquency difference $\Delta f$ to be a running variable, should be as small as possible for $\Delta f$ greater than $(\Delta f)_{min.}$.

In order to satisfy the conflicting requirements enumerated above and yet produce a set of filters that may be manufactured conveniently, a compromise of design between the requirements is followed in practice. One suitable type of filter, conveniently termed a rectangular filter, has a truncated symmetrical impulse response given by $$h(t)=\sum_{k=1}^{l}\beta_k[\delta(t-\overline{k+l}\tau)+\delta(t+\overline{k-l}\tau)]+\delta(t-l\tau) \quad (3)$$

where $\beta_k$ denotes a coefficient which is either +1 or −1, each with a probability of one-half, and $l$ is equal to one-half of the number of repetitions of signal each delayed from the preceding by interval $\tau$, diminished by one; i.e., the number of repetitions is equal to $2l+1$. Filters constructed according to Equation 3, i.e., rectangular filters, afford a good compromise between requirements (2) and (3) and are easy to implement. The best results have been obtained with $l$ greater than 15 and $l\tau$ between 15 and 25 $\mu$sec. In practice, it has been found that a symmetrical transversal filter with an impulse response consisting of approximately 50 equal amplitude pulses with random polarities distributed over about 50 μsec., is quite satisfactory. Such a filter adds little coloration or reverberation to the signal but has such characteristics that fading is almost completely eliminated with as few as four channel.

Figure 2:
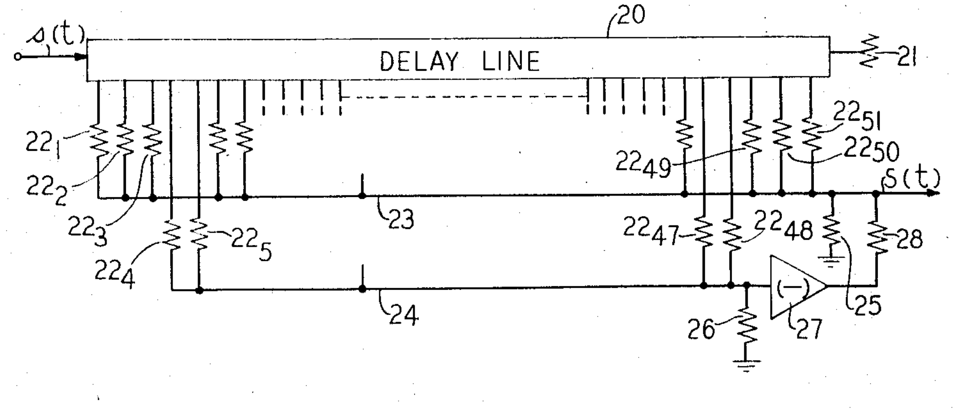
FIG. 2 illustrates schematically a filter network suitable for use in the practice of the invention.

FIG. 2 illustrates a suitable filter network that may be used in the practice of the invention. It is a so-called rectangular filter which employs a transversal filter and exhibits a truncated symmetric impulse response. Signals $s(t)$ from source 10 (FIG. 1) are applied to the input point of wave propagation device or delay line 20 of which the output point is terminated in a matched impedance element 21 to prevent reflection. The delay device, which may comprise a plurality of like reactance networks connected in tandem, each having series inductance and shunt capacitance, is provided with a plurality of lateral taps along its length. In practice, 51 taps evenly spaced along the line at intervals 0.7 to 1 ms. apart have been used with excellent results. Evidently, the wave $s(t)$ reappears in succession at each of the lateral taps after a delay determined in each case by the length of the line from its input point to that lateral tap. The energy paths extending from the several taps are connected together according to a random schedule of polarities to form an output signal $S(t)$. A different random schedule of polarities is selected for each of the networks 11 used in the several channels of a single transmitter station.

Figure 3:
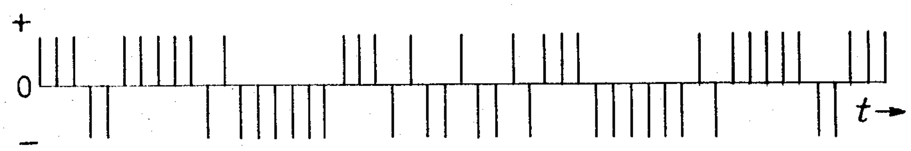
FIG. 3 illustrates a typical impulse response of a filter network, e.g., the one illustrated in FIG. 2.

For the example shown in FIG. 2, signals from the several taps are supplied by way of isolating impedance means, for example, by way of like resistors 22N, to one of two buses 23 and 24 according to the selected random schedule. Thus, the network shown in FIG. 2 is programmed according to a schedule selected, for example, from a table of random numbers. The resulting impulse response is shown in FIG. 3. For the example shown, and which yields the impulse response of FIG. 3, the first three taps of delay line 20 are connected by way of resistors $\mathbf{22_1}$, $\mathbf{22_2}$, and $\mathbf{22_3}$ to bus 23, and the next two taps are connected by way of resistors $\mathbf{22_4}$ and $\mathbf{22_5}$ to bus 24. Similar connections are made between other taps and the positive (23) and negative (24) buses according to the desired schedule. Delayed repetitions of the input signal which appear on bus 23 are developed across shunt impedance 25 and delayed repetitions which appear on bus 24 are developed across shunt impedance 26. Signals from negative bus 24 are conveniently inverted in polarity as a whole in operational amplifier 27. Signals from negative bus 24 are passed through isolating resistor 28 and combined additively with signals from positive bus 23 to produce a composite signal $S(t)$.

Figure 4:
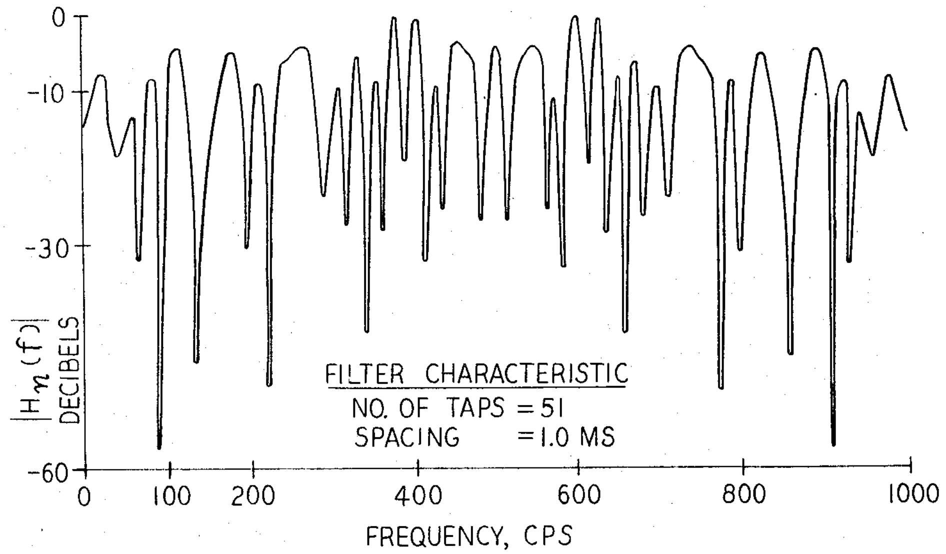
FIG. 4 illustrates the frequency response of a typical filter network suitable for producing uncorrelated speech signals in accordance with the invention.

FIG. 4 illustrates the frequency responses of the network of FIG. 2. It will be appreciated that the response is very irregular and varies by as much as 60 db between frequencies separated from one another by as little as 30 cycles.

Since the impulse response, and consequently the frequency response, of the several networks used at one transmitter station are entirely different from one another, it is apparent that fading which occurs in each channel will most probably not affect the signal in another channel, at least not at the same frequency. The vectoral sum of the signals at the receiving antenna produces a relatively constant signal which may be detected by simple envelope detection. It should be noted however, that for fading rates greater than about 16 c.p.s., speech diversity yields no appreciable improvement over a single fading channel, mainly because such fast fading produces undesirable sidebands outside the line widths of voiced speech sounds. On the other hand, various kinds of distortion produced in a system employing the several channels according to the invention result in a very small change in the over-all quality of speech. One kind of distortion, which at first blush may seem to be very bad, is produced by the individual fading of the carrier and the sidebands. In practice, however, this form of distortion has been found to have no appreciable effect on overall speech quality.

Delay line 20 may, of course, be provided with a reflective termination in order to halve its over-all length and the number of taps required. Since the required impulse response is symmetrical, each tap may thus be made to serve both for signals traveling down the line and also for those returning after reflection from the end of the line. So-called folded lines of this sort are well known in the art.

Further economies in implementing the processing networks used in the several channels of the transmitter station may be secured, for example, by employing one delay line only, with the desired number of equally spaced taps, and supplying the delayed signal developed at each tap to an isolation device, such as an amplifier or passive network, provided with a plurality of separate but identical outputs. The several signals so produced are then supplied individually to the channels of the transmitter and there interconnected with other delayed signals, produced at other taps, according to a schedule of polarities, different for each, to develop $S_n(t)$. It will be apparent to those skilled in the art that various other interconnections of the delay line signals may also be used in implementing the networks of the invention.

Thus, although transversal filter networks are preferred because of their simplicity, other networks characterized by the impulse and frequency responses of the general form illustrated in FIGS. 3 and 4, respectively, may of course be used in the practice of the invention.

The above-described arrangements are merely illustrative of the application and principles of the invention. Numerous other arrangements may be devised by those skilled in the art without departing from the spirit and scope of the invention. For example, one direct channel may be employed at the transmitter station along with a number of individually processed auxiliary channels. By this technique, the number of filter networks required may be reduced without seriously reducing the effectiveness of the system. Furthermore, single sideband modulation may also be used. In this case, additional time varying phase distortion may be produced. However, such distortion has been found to be small for slow fading rates.

What is claimed is:

1. A diversity transmission system which comprises, in combination, a plurality of spaced apart signal transmitters operating on the same carrier frequency, signal receiver means for receiving signals from said transmitters, a source of information signals, and signal processing network means supplied with information signals from said source in circuit relation with each of said transmitters, each of said network means being proportioned to pass the entire frequency spectrum of said signals supplied to said related transmitter, each being characterized by a different highly irregular frequency response, said signal processing network means being effective to produce a corresponding plurality of uncorrelated renditions of said supplied information signals.

2. A diversity system as defined in claim 1 wherein each of said signal processing network means comprises, a transversal filter supplied with signals from said source, a plurality of individual means supplied with delayed signals developed by said filter for developing a composite signal based on a random distribution of positive and negative polarities, and means for supplying one of said composite signals to each of said transmitters.

3. A diversity transmission system which comprises, a plurality of spaced transmitter stations operating on the same carrier frequency, at least one receiver station separated from said transmitter stations which includes means for detecting signals received on said carrier frequency, a source of signals, a plurality of linear networks, each with a truncated irregular frequency response, for simultaneously producing a corresponding plurality of essentially uncorrelated renditions of signals applied thereto from said source, the plurality of renditions having the property that any linear combination of them does not differ appreciably from said applied signal in subjective quality or intelligibility, and means for simultaneously supplying one of said signal renditions to each of said transmitter stations.

4. A transmission system which comprises, a plurality of spaced transmitters operating on the same carrier frequency, at least one receiver separated from said transmitters tuned to said carrier frequency, a source of signals, means for simultaneously supplying signals from said source to each of said transmitters, and network means in circuit relation with each of said transmitters, each of said networks being characterized by a truncated irregular frequency response, the truncated response of each of said networks being different from all others.

5. A transmission system as defined in claim 4 wherein said network means comprises, a linear transversal filter, means for selectively combining individually delayed output signals developed by said transversal filter according to a linear schedule of polarities, and means for selecting said schedule according to a different random pattern for each of said networks.

6. A transmission system as defined in claim 4 wherein said network comprises, a delay line equipped with a signal input terminal, a plurality of signal output terminals linearly spaced along its delay length, means for supplying signals from said source to said input terminal, and means for algebraically combining signals from said output terminals according to a random schedule of polarities, said random schedule differing for each of said networks.

7. A transmission system as defined in claim 6 wherein said means for algebraically combining said signals from said output terminals comprises, means for isolating signals from each output terminal from all others, means for combining signals scheduled for positive polarity to produce a first composite signal, means for combining signals scheduled for negative polarity, means for inverting the polarity of said combined signals scheduled for negative polarity to produce a second composite signal, and means for combining said first and said second composite signals to produce an output signal.

8. A diversity transmission system which comprises, a source of message signals, a transmitter station which includes a plurality of signal channels, means for simultaneously supplying a message signal to all of said signal channels, network means in each of said signal channels for processing applied message signals, each of said network means including a linear filter with a truncated symmetric impulse response, the truncated impulse response of each of said filters being selected in accordance with a prescribed different random schedule, means in each of said signal channels for modulating a carrier wave with signals developed by said processing means, means for generating and supplying the same carrier wave to each of said modulating means, at least one receiver station spaced apart from said transmitter station and tuned to said carrier wave frequency, and detector means at said receiver station for recovering said message signal.

9. In a diversity transmission system which includes a plurality of spaced signal transmission means operating on the same carrier frequency for the transmission of message signal energy, the combination which comprises, a source of message signals, a plurality of signal processing networks, each of said networks having an irregular frequency response which differs from the frequency responses of the others of said networks, means for applying message signals from said source simultaneously to all of said networks, a plurality of signal modulation means, a carrier frequency signal generator, means for energizing all of said modulation means with signals from said carrier signal generator, means for energizing each one of said modulation means respectively with processed signals developed by one of said processing networks, a plurality of spaced signal transmission means, and means for supplying the modulated carrier frequency signals developed by each one of said modulation means respectively to each one of said signal transmission means.

10. In a diversity transmission system which includes a plurality of spaced signal transmission means operating on the same carrier frequency for the transmission of message signal energy to signal receiver means separate from said transmission means, the combination which comprises, a source of message signals, a plurality of signal processing networks, each of said networks having a truncated irregular impulse response which differs from the impulse responses of the others of said networks, means for applying message signals from said source simultaneously to all of said networks, a plurality of signal modulation means, a carrier frequency signal generator, means for energizing all of said modulation means with signals from said carrier signal generator, means for energizing each one of said modulation means respectively with processed signals developed by one of said processing networks, a plurality of spaced signal transmission means, means for supplying the modulated carrier frequency signals developed by each one of said modulation means respectively to each one of said signal transmission means, and means spaced apart from all of said signal transmission means for recovering said transmitted signals.

References Cited

UNITED STATES PATENTS

| | | | |
|---|---|---|---|
| 1,227,113 | 5/1917 | Campbell ___________ | 333—70 |
| 1,836,129 | 12/1931 | Potter _____________ | 325—157 |
| 2,880,275 | 4/1959 | Kahn ______________ | 179—15 |
| 3,125,724 | 3/1964 | Foulkes et al. _______ | 325—154 |
| 3,252,093 | 5/1966 | Lerner ____________ | 333—29 X |

JOHN W. CALDWELL, *Acting Primary Examiner.*

DAVID G. REDINBAUGH, *Examiner.*

B. V. SAFOUREK, *Assistant Examiner.*